US010126886B2

(12) United States Patent
Choi et al.

(10) Patent No.: US 10,126,886 B2
(45) Date of Patent: Nov. 13, 2018

(54) ELECTRODE PATTERN, MANUFACTURING METHOD THEREOF, AND TOUCH SENSOR INCLUDING THE SAME

(71) Applicant: SAMSUNG DISPLAY CO., LTD., Yongin, Gyeonggi-Do (KR)

(72) Inventors: Shin Il Choi, Hwaseong-si (KR); Jae Neung Kim, Seoul (KR); Su Bin Bae, Gyeongsan-si (KR); Yu-Gwang Jeong, Anyang-si (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 18 days.

(21) Appl. No.: 14/712,953

(22) Filed: May 15, 2015

(65) Prior Publication Data

US 2016/0170521 A1 Jun. 16, 2016

(30) Foreign Application Priority Data

Dec. 11, 2014 (KR) .................... 10-2014-0178501

(51) Int. Cl.
*G06F 3/045* (2006.01)
*G06F 3/044* (2006.01)

(52) U.S. Cl.
CPC .... *G06F 3/044* (2013.01); *G06F 2203/04103* (2013.01); *G06F 2203/04111* (2013.01); *G06F 2203/04112* (2013.01)

(58) Field of Classification Search
CPC . G06F 2203/04103; G06F 2203/04111; G06F 2203/04112; G06F 3/044; H01L 21/00
See application file for complete search history.

(56) References Cited

U.S. PATENT DOCUMENTS

| 2008/0179605 | A1* | 7/2008 | Takase | H01L 33/32 257/94 |
| 2011/0187672 | A1* | 8/2011 | Hung | G06F 3/044 345/174 |
| 2013/0258568 | A1* | 10/2013 | Iwata | H01B 1/22 361/679.01 |
| 2014/0077185 | A1* | 3/2014 | Lee | H01L 51/5275 257/40 |
| 2014/0240622 | A1* | 8/2014 | Watazu | G06F 3/044 349/12 |
| 2014/0302440 | A1* | 10/2014 | Hashimoto | G06F 3/044 430/316 |

FOREIGN PATENT DOCUMENTS

| KR | 10-2005-0093340 A | 9/2005 |
| KR | 10-2008-0080855 A | 9/2008 |
| KR | 10-2009-0087374 A | 8/2009 |
| KR | 10-2012-0010359 A | 2/2012 |
| KR | 10-2012-0075124 A | 7/2012 |
| KR | 10-1320525 B1 | 10/2013 |

* cited by examiner

*Primary Examiner* — Insa Sadio
(74) *Attorney, Agent, or Firm* — Lee & Morse, P.C.

(57) ABSTRACT

A transparent electrode pattern includes a first electrode including a first lower conductive layer and a first upper conductive layer located on the first lower conductive layer and a second electrode spaced apart from the first electrode and including a second lower conductive layer and a second upper conductive layer positioned on the second lower conductive layer. The first and second lower conductive layers may include a metal nanowire. The first and second upper conductive layers may include a transparent conductive material that is dry-etchable.

10 Claims, 10 Drawing Sheets

ELECTRODE PATTERN, MANUFACTURING METHOD THEREOF, AND TOUCH SENSOR INCLUDING THE SAME

CROSS-REFERENCE TO RELATED APPLICATION

Korean Patent Application No. 10-2014-0178501, filed on Dec. 11, 2014, in the Korean Intellectual Property Office, and entitled: "Electrode Pattern, Manufacturing Method Thereof, and Touch Sensor Including the Same," is incorporated by reference herein in its entirety.

BACKGROUND

1. Field

Embodiments relate to a transparent electrode pattern, a manufacturing method thereof, and a touch sensor including the same. More particularly, the present invention relates to a transparent electrode pattern including a metal nanowire, a manufacturing method thereof, and a touch sensor including the same.

2. Description of the Related Art

Flexible electronic devices that have been recently developed may include a portion that is exemplarily foldable, rollable, stretchable in at least one direction, or may be elastic and deformed. The flexible electronic device may generally include a plurality of electrode patterns. The plurality of electrode patterns may also have flexibility such as to not generate a failure after deformation of the flexible electronic device.

As a material for the electrode having flexibility, various materials such as a nanowire like a silver nanowire (AgNW), a carbon nanotube, graphene, a metal mesh, a conductive polymer, etc., may be used.

The electronic device such as a display device, a portable transmission device, and other information processing devices execute functions by using various input devices. Techniques for allowing a user's finger or a pen to contact an electronic device and have it function as an input device without an additional devices such as a keyboard have been developed. The electronic device having the touch sensing function may be used to find touch information such as whether an object touches a screen and a touch location thereof by sensing a change in pressure applied to the screen, charges, light, and the like by the display, when a user touches a finger or a touch pen to the screen. For example, the display device having the touch sensing function may receive an image signal based on the touch information and may display the image.

The touch sensing function may be implemented by a touch sensor. The touch sensor may be classified into various touch sensing types such as a resistive type, a capacitive type, an electromagnetic resonance (EMR) type, and an optical sensing type.

In the case of a resistive type of touch sensor, two electrodes spaced apart from each other while facing each other may contact each other by a pressure from an external object. When the two electrodes contact each other, the contact positions and the like can be determined by recognizing a change in voltage depending on a change in resistance at the contact position.

The capacitive type of touch sensor includes a detection capacitor formed of a detection electrode capable of transferring a detection signal and detecting a change in capacitance of the detection capacitor generated when conductors, such as a finger, approach the sensor to determine the contact or not, the contact positions, and the like. In the capacitance type, the user must always contact the touch screen to detect the touch, and contact by a conductive object is required.

In the display device having the touch sensing function, a touch sensor unit including the touch sensor may be used by being installed in the display device (an in-cell type), by being formed on an outer surface of the display device (an on-cell type), or by being attached as a separate touch sensor panel to the display device (an add-on cell type). When the display device is the flexible display device having flexibility, the touch sensor unit therein may include a flexible electrode pattern having flexibility. Also, the electrode pattern forming the touch sensor must commonly transmit the light of the image, and in this case, the electrode pattern may be transparent.

SUMMARY

Embodiments are directed to a transparent electrode pattern including a first electrode including a first lower conductive layer and a first upper conductive layer located on the first lower conductive layer and a second electrode spaced apart from the first electrode and including a second lower conductive layer and a second upper conductive layer positioned on the second lower conductive layer. The first and second lower conductive layers may include a metal nanowire. The first and second upper conductive layers may include a transparent conductive material that is dry-etchable.

The first and second upper conductive layers may include GTO (gallium tin oxide).

An edge of the first lower conductive layer and an edge of the first upper conductive layer may be substantially aligned. An edge of the second lower conductive layer and an edge of the second upper conductive layer may be substantially aligned.

The first and second lower conductive layers may further include an overcoat.

The overcoat may extend to be positioned between the first lower conductive layer and the second lower conductive layer.

Embodiments are also directed to a transparent electrode pattern including a first electrode including a first lower conductive layer and a first upper conductive layer positioned on the first lower conductive layer and a second electrode spaced apart from the first electrode and including a second lower conductive layer and a second upper conductive layer positioned on the second lower conductive layer. The first and second lower conductive layers include a metal nanowire. The first and second upper conductive layers include a transparent conductive material. A plasma gas composition including chlorine (Cl) or bromine (Br) is present on a surface of the first and second upper conductive layers.

The first and second upper conductive layers may include a conductive metal oxide.

An edge of the first lower conductive layer and an edge of the first upper conductive layer may be substantially aligned. An edge of the second lower conductive layer and an edge of the second upper conductive layer may be substantially aligned.

The first and second lower conductive layers may further include an overcoat.

The overcoat may extend to be positioned between the first lower conductive layer and the second lower conductive layer.

Embodiments are also directed to a method for manufacturing a transparent electrode pattern including forming a lower conductive layer including a metal nanowire on a substrate, depositing a transparent conductive material that is dry-etchable on the lower conductive layer to form an upper conductive layer, forming a photosensitive film pattern on the upper conductive layer, dry-etching the upper conductive layer using the photosensitive film pattern as a mask and using an etching gas, and stripping the photosensitive film pattern.

In dry-etching the upper conductive layer, the metal nanowire and the etching gas may react, thereby forming a metal compound. Stripping the photosensitive film pattern may include removing the metal compound of the lower conductive layer that is not covered by the photosensitive film pattern.

The upper conductive layer may include GTO (gallium tin oxide).

The lower conductive layer may include an overcoat. Dry-etching the upper conductive layer may include etching at least a portion of the overcoat.

Embodiments are also directed to a method for manufacturing a transparent electrode pattern including forming a lower conductive layer including a metal nanowire on a substrate, forming a photosensitive film pattern on the lower conductive layer, reflowing the photosensitive film pattern to form an undercut structure, depositing a transparent conductive material on the photosensitive film pattern and the lower conductive layer to form an upper conductive layer, stripping the photosensitive film pattern and lifting off the upper conductive layer positioned on the photosensitive film pattern to form a first upper conductive layer and a second upper conductive layer that are separated from each other, plasma treating an upper face of the first and second upper conductive layers and the lower conductive layer, and removing a metal compound formed by reacting of the metal nanowire with a plasma gas in the plasma treatment.

The plasma gas may include chlorine (Cl) or bromine (Br).

Embodiments are also directed to a touch sensor including a plurality of touch electrodes, the plurality of touch electrodes including a first electrode including a first lower conductive layer and a first upper conductive layer positioned on the first lower conductive layer, and a second electrode spaced apart from the first electrode and including a second lower conductive layer and a second upper conductive layer positioned on the second lower conductive layer. The first and second lower conductive layers includes a metal nanowire. The first and second upper conductive layers include a transparent conductive material that is dry-etchable.

The first and second upper conductive layers may include GTO (gallium tin oxide).

Embodiments are also directed to a touch sensor including a plurality of touch electrodes including a first electrode including a first lower conductive layer and a first upper conductive layer positioned on the first lower conductive layer, and a second electrode spaced apart from the first electrode and including a second lower conductive layer and a second upper conductive layer positioned on the second lower conductive layer. The first and second lower conductive layers includes a metal nanowire. The first and second upper conductive layers includes a transparent conductive material. A plasma gas composition including chlorine (Cl) or bromine (Br) is present on a surface of the first and second upper conductive layers.

An edge of the first lower conductive layer and an edge of the first upper conductive layer may be substantially aligned. An edge of the second lower conductive layer and an edge of the second upper conductive layer may be substantially aligned.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

First, a transparent electrode pattern according to an exemplary embodiment will be described with reference to FIG. 1 and FIG. 2.

Figure 1:
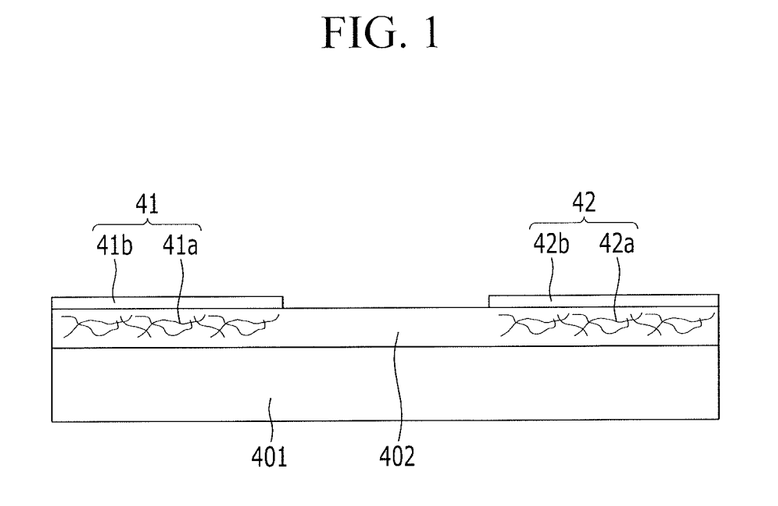
FIG. 1 illustrates a cross-sectional view of a transparent electrode pattern according to an exemplary embodiment.
Figure 2:
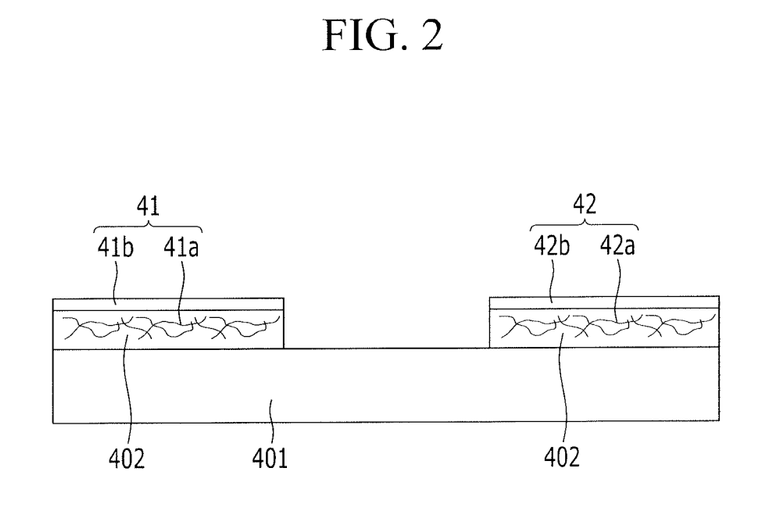
FIG. 2 illustrates a cross-sectional view of a transparent electrode pattern according to an exemplary embodiment.

FIG. 1 and FIG. 2 are cross-sectional views of an electrode pattern according to an exemplary embodiment.

Referring to FIG. 1 and FIG. 2, a transparent electrode pattern according to an exemplary embodiment may be positioned on a substrate 401. In some implementations, the substrate 401 may include a plastic such as a polycarbonate, a polyimide, and polyethersulfone, or glass. In some implementations, the substrate 401 may be a transparent flexible substrate that is foldable, bendable, rollable, or stretchable in at least one direction and has flexibility such as elasticity.

The transparent electrode pattern according to an exemplary embodiment may include a first electrode 41 and a second electrode 42 that are insulated from each other.

The first electrode 41 may include a first lower conductive layer 41a and a first upper conductive layer 41b formed thereon. The second electrode 42 may include a second lower conductive layer 42a and a second upper conductive layer 42b formed thereon. The first lower conductive layer 41a and the second lower conductive layer 42a may be positioned at the same layer and may include the same material. The first upper conductive layer 41b and the second upper conductive layer 42b are positioned at the same layer and include the same material.

The first and second lower conductive layers 41a and 42a may include a metal nanowire such as a silver (Ag) or copper (Cu) nanowire. The metal nanowires included in the first electrode 41 and the second electrode 42 may be connected in a shape of a mesh. The first electrode 41 and the second electrode 42 may respectively form a conductive electrode. The metal nanowire may not be positioned between the first electrode 41 and the second electrode 42.

The metal nanowire may be formed by various processes such as solution process, spraying, and printing.

The first and second lower conductive layers 41a and 42a may further include an overcoat 402 protecting the metal nanowire and fixing the metal nanowire. The overcoat 402 may include an acrylate-based organic material such as an acryl polyester resin. The overcoat 402 may be coated on the metal nanowire after forming the metal nanowire. The overcoat 402 may fill a space between the metal nanowires and may increase adherence between the metal nanowire and the substrate 401.

Referring to FIG. 1, the overcoat 402 may be positioned between the first lower conductive layer 41a of the first electrode 41 and the second lower conductive layer 42a of the second electrode 42. In this case, the overcoat 402 positioned between the first lower conductive layer 41a of the first electrode 41 and the second lower conductive layer 42a of the second electrode 42 may be connected to the overcoat 402 of the first lower conductive layer 41a and the second lower conductive layer 42a. The thickness of the overcoat 402 positioned between the first lower conductive layer 41a of the first electrode 41 and the second lower conductive layer 42a of the second electrode 42 may be different from the thickness of the overcoat 402 of the first lower conductive layer 41a and the second lower conductive layer 42a. For example, the thickness of the overcoat 402 positioned between the first lower conductive layer 41a of the first electrode 41 and the second lower conductive layer 42a of the second electrode 42 may be smaller than the thickness of the overcoat 402 of the first lower conductive layer 41a and the second lower conductive layer 42a.

The first and second lower conductive layers 41a and 42a including the metal nanowire may have high transmittance and a sheet resistance characteristic of less than a predetermined reference to have high conductivity. Also, the first and second lower conductive layers 41a and 42a including the metal nanowire may have high flexibility compared with the transparent conductive material such as ITO and IZO.

The first and second upper conductive layers 41b and 42b, as layers assisting conductivity of the first and second lower conductive layers 41a and 42a including the metal nanowire, may have transmittance of more than a predetermined reference. The first and second upper conductive layers 41b and 42b may include a transparent conductive material that can be dry-etched. For example, the first and second upper conductive layers 41b and 42b may include GTO (gallium (Ga)-tin (Sn)-oxide), which may have a transmittance of more than about 85% with respect to a visible ray region.

When patterning the first and second upper conductive layers 41b and 42b including the GTO by mainly using a dry-etching gas such as fluorine (F) or chloride ($Cl_2$) gas, the boiling point of generated gallium chloride ($GaCl_3$) is about −35 degrees Celsius and the boiling point of generated tin chloride (SnCl4) is about −100 degrees Celsius such that the gallium chloride ($GaCl_3$) and the tin chloride ($SnCl_4$) may be vaporized at room temperature. Accordingly, differently from no and IZO that are patterned by wet etching, the GTO can be dry-etched by using a dry-etching gas such as fluorine (F) or chlorine ($Cl_2$) gas.

In some implementations, the first and second upper conductive layers 41b and 42b may include various transparent conductive materials such as ITO and IZO.

A conductive polymer layer may be further positioned between the first and second lower conductive layers 41a and 42a and the first and second upper conductive layers 42a and 42b. The conductive polymer layer may include a conductive polymer material such as poly(3,4-ethylenedioxythiophene)polystyrene sulfonate (PEDOT:PSS).

Referring to FIG. 2, in some implementations, the overcoat 402 may be removed between the first lower conductive layer 41a of the first electrode 41 and the second lower conductive layer 42a of the second electrode 42, as shown. The overcoat 402 may be patterned along with the first electrode 41 and the second electrode 42. In some implementations, the overcoat 402 may be positioned between the first lower conductive layer 41a of the first electrode 41 and the second lower conductive layer 42a of the second electrode 42, and the thickness thereof may be smaller than the thickness of the overcoat 402 positioned at the first lower conductive layer 41a and the second lower conductive layer 42a.

A touch sensor unit including a touch sensor including the transparent electrode pattern according to an exemplary embodiment will be described with reference to FIG. 3 to FIG. 5 as well as FIG. 1 and FIG. 2.

Figure 3:
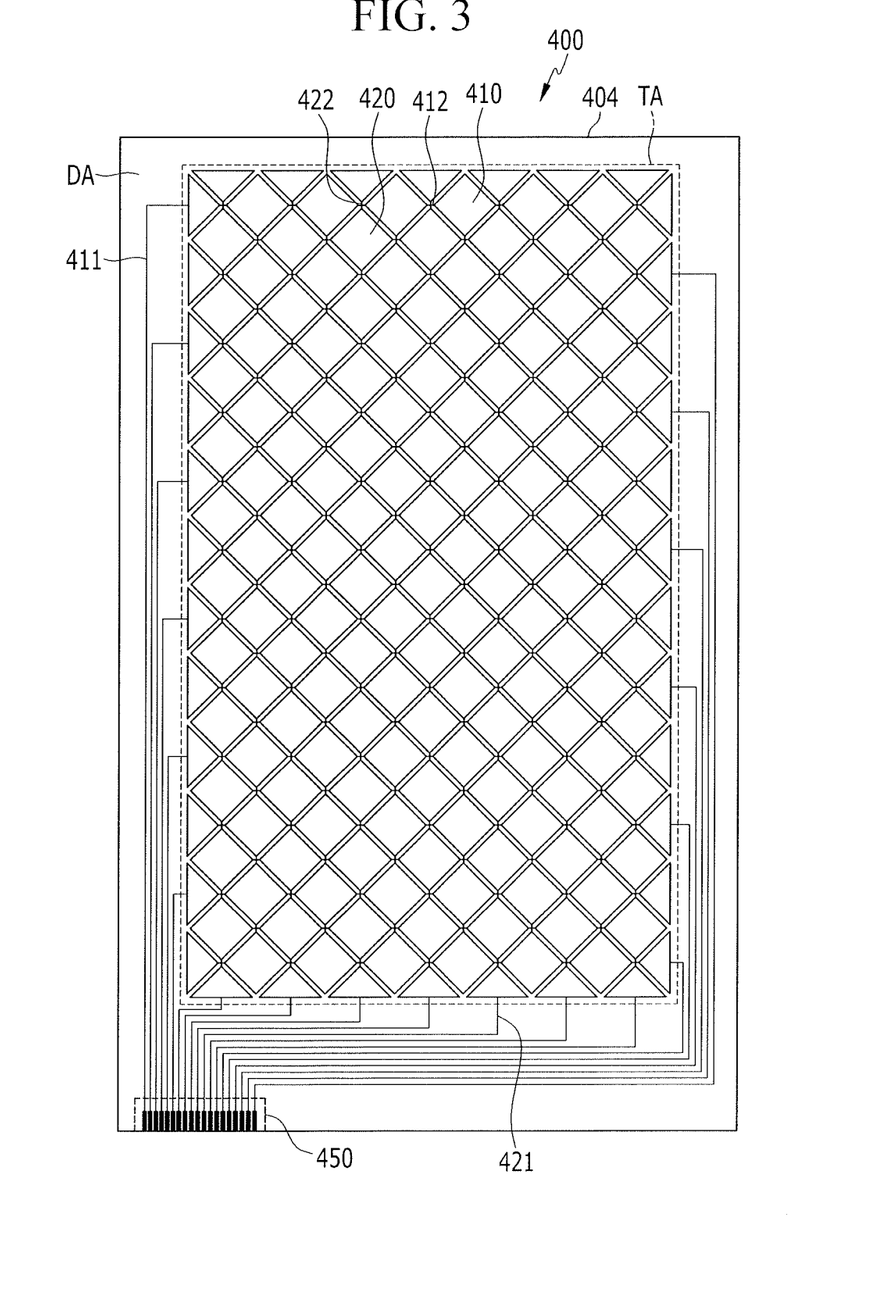
FIG. 3 illustrates a top plan view of a touch sensor unit including a transparent electrode pattern according to an exemplary embodiment.
Figure 4:
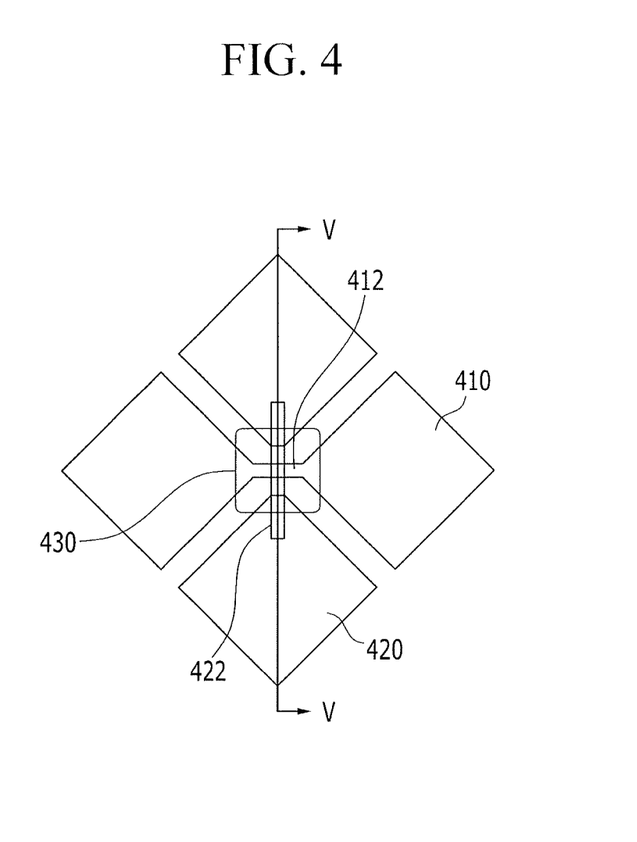
FIG. 4 illustrates a top plan view of a touch sensor including a touch sensor unit according to an exemplary embodiment.
Figure 5:
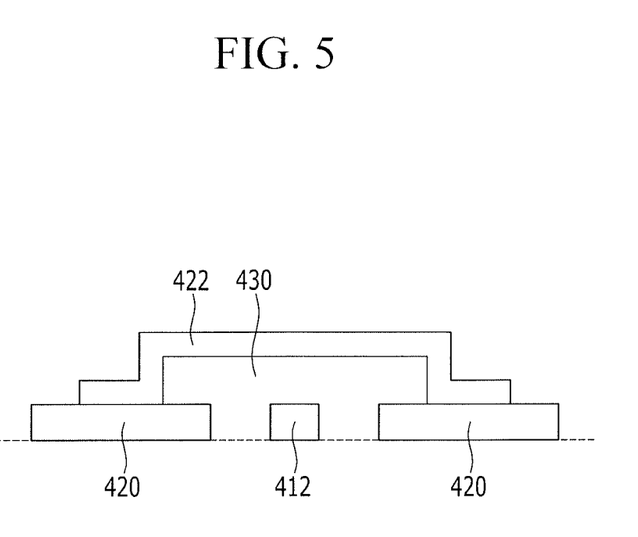
FIG. 5 illustrates a cross-sectional view of a touch sensor shown in FIG. 4 taken along a line V-V.

FIG. 3 is a top plan view of a touch sensor unit including a transparent electrode pattern according to an exemplary embodiment, FIG. 4 is a top plan view of a touch sensor including a touch sensor unit according to an exemplary embodiment, and FIG. 5 is a cross-sectional view of a touch sensor shown in FIG. 4 taken along a line V-V.

Referring to FIG. 3, a touch sensor unit 400 according to an exemplary embodiment may include a plurality of first touch electrodes 410 and a plurality of second touch electrodes 420 positioned on a touch substrate 404. The first touch electrode 410 and the second touch electrode 420 may have the same structure as the above-described transparent electrode pattern. The touch substrate 404 may be a flexible substrate having flexibility and transparency.

The first touch electrodes 410 and the second touch electrodes 420 may be alternately dispersed and disposed in the touch sensing region TA. The plurality of first touch electrodes 410 may be disposed in the column direction and the row direction, and the plurality of second touch electrode 420 may also be disposed in the column direction and the row direction.

The first touch electrode 410 and the second touch electrode 420 may be positioned at the same layer In some implementations, the first touch electrode 410 and the second touch electrode 420 may be positioned at different layers. When the first touch electrode 410 and the second touch electrode 420 are positioned at different layers, the first touch electrode 410 and the second touch electrode 420 may be positioned at difference surfaces from each touch substrate 404 and may be positioned at different layers on the same surface of the touch substrate 404.

Each of the first touch electrode 410 and the second touch electrode 420 may have shape of a quadrangle. In some implementations, each of the first touch electrode 410 and the second touch electrode 420 may have various forms, such as a form having a protrusion, in order to improve sensitivity of the touch detecting sensor.

The plurality of first touch electrodes 410 arranged in the same row or column may be connected with or separated from each other inside or outside the touch sensing area TA. Similarly, at least some of the plurality of second touch electrodes 420 arranged in the same column or row may be connected with or separated from each other inside or outside the touch sensing area TA. For example, in a case where the plurality of first touch electrodes 410 arranged in the same row are connected with each other inside the touch sensing area TA as illustrated in FIG. 3, the plurality of second touch electrodes 420 arranged in the same column may be connected with each other inside the touch sensing area TA. For example, the plurality of first touch electrodes 410 positioned in each row may be connected with each other through a first connection part 412, and the plurality of second touch electrodes 420 positioned in each column may be connected with each other through a second connection part 422.

Referring to FIG. 4 and FIG. 5, the first connection part 412 connecting the adjacent first touch electrodes 410 may be positioned on the same layer as that of the first touch electrode 410 and formed of the same material as that of the first touch electrode 410. That is, the first touch electrode 410 and the first connection part 412 may be integrated with each other, and may be simultaneously patterned.

The second connection part 422 connecting the adjacent second touch electrodes 420 may be positioned on a different layer from that of the second touch electrode 420. That is, the second touch electrode 420 and the first connection part 412 may be separated from each other, and may be separately patterned. The second touch electrode 420 and the second connection part 422 may be connected with each other through direct contact.

An insulating layer 430 may be positioned between the first connection part 412 and the second connection part 422 to insulate the first connection part 412 and the second connection part 422 from each other. The insulating layers 430 may be a plurality of separated island-shaped insulators disposed at every crossing portion of the first connection part 412 and the second connection part 422 as illustrated in FIGS. 3 and 4. The insulating layer 430 may expose at least a part of the second touch electrode 420 so that the second connection part 422 is connectable with the second touch electrode 420.

According to another exemplary embodiment, the insulating layer 430 may be formed on the entire area on the touch substrate 404. The insulating layer 430 positioned on the portion of the second touch electrode 420 may be removed for the connection of the second touch electrodes 420 in the adjacent column direction.

In other implementations, contrary to FIG. 4 and FIG. 5, a second connection part 422 connecting the adjacent second touch electrodes 420 may be positioned on the same layer as that of a first touch electrode 410 and integrated with the first touch electrode 410. A first connection part 412 connecting adjacent first touch electrodes 410 may be positioned on a different layer from that of the first touch electrode 410.

Referring to FIG. 3, the first touch electrodes 410 connected with each other in each row may be connected with the touch controller through a first touch wire 411, and the second touch electrodes 420 connected with each other in each column may be connected with the touch driver through a second touch wire 421. The first touch wire 411 and the second touch wire 421 may be positioned in the peripheral area of a display panel. In some implementations, the first touch wire 411 and the second touch wire 421 may be positioned in the touch active area TA.

End portions of the first touch wire 411 and the second touch wire 421 form a pad portion 450 in the non-sensing area DA of the touch sensor unit 400.

The first touch wire 411 may input the sensing input signal to the first touch electrode 410 or may output the sensing output signal to the touch driver through the pad portion 450. The second touch wire 421 may input the sensing input signal to the second touch electrode 420 and may output the sensing output signal through the pad portion 450.

The first touch electrode 410 and the second touch electrode 420, which are adjacent to each other, may form a mutual sensing capacitor serving as the touch sensor. The mutual sensing capacitor may receive a detection input signal through one of the first touch electrode 410 and the second touch electrode 420, and may output a change in an amount of charges by a touch of an external object to the other touch electrode as a detection output signal.

In other implementations, the plurality of first touch electrodes 410 and the plurality of second touch electrodes 420 may be separated from each other to be connected with the touch driver through touch wires, respectively. In this case, each touch electrode 410 and 420 may form a self-sensing capacitor as the touch sensor. The self-sensing capacitor may receive the detection input signal and be charged with a predetermined charge amount, and when a touch of an external object such as a finger is generated, a charged charge amount may be changed, such that the self-sensing capacitor may output a detection output signal that is different from the input detection input signal.

The structure of the touch sensor including the transparent electrode pattern according to an exemplary embodiment may be variously changed.

Next, a manufacturing method of the transparent electrode pattern according to an exemplary embodiment will be described with reference to FIG. 6 to FIG. 9 as well as FIG. 1 and FIG. 2.

Figure 6:
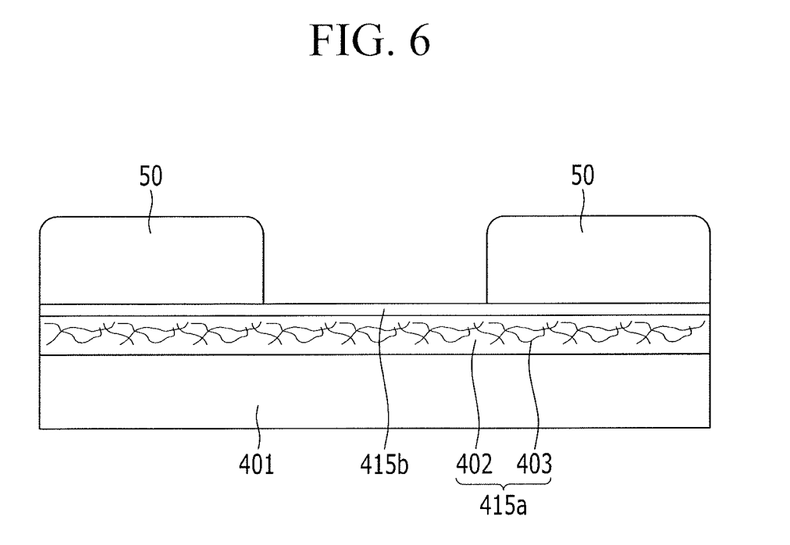
FIG. 6 illustrates a cross-sectional view of an intermediate manufactured material at one stage of a process according to a manufacturing method of a transparent electrode pattern according to an exemplary embodiment.
Figure 7:
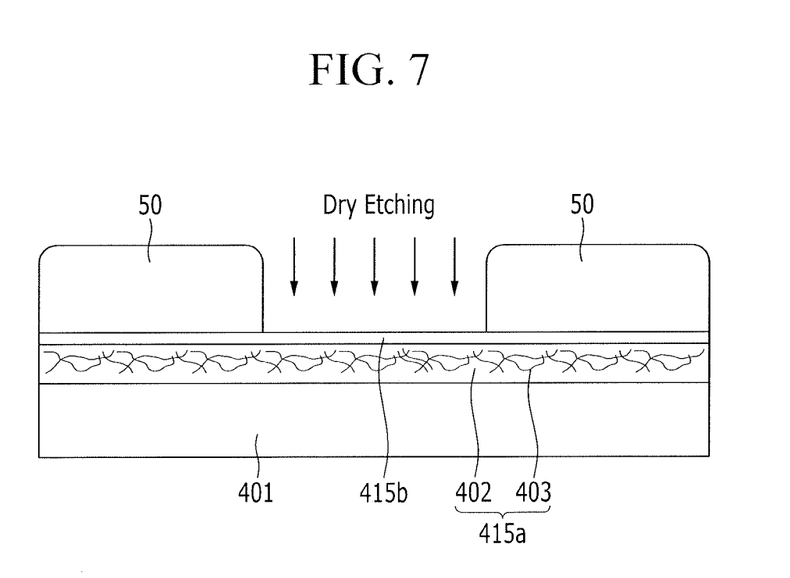
FIG. 7 illustrates a cross-sectional view of an intermediate manufactured material at a stage following the stage shown in FIG. 6 in a process according to a manufacturing method of a transparent electrode pattern according to an exemplary embodiment.
Figure 8:
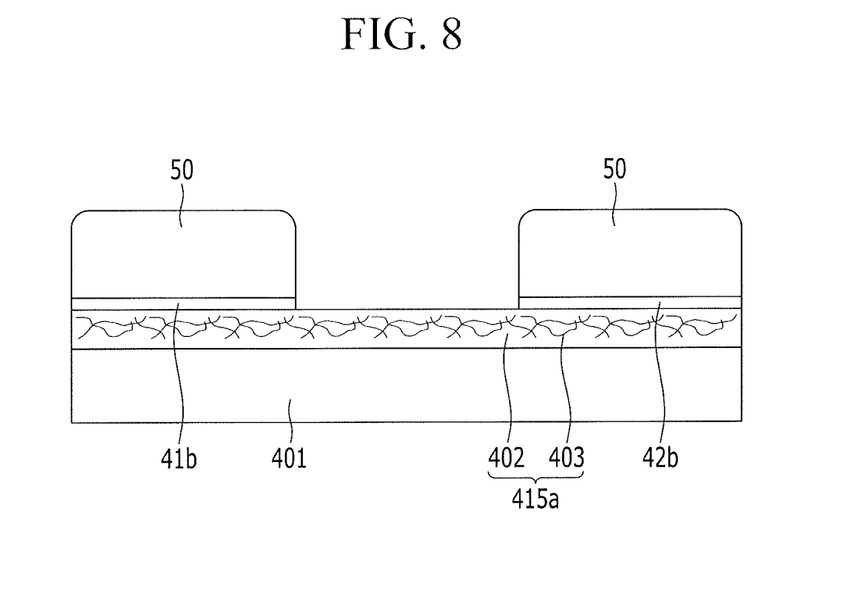
FIG. 8 illustrates a cross-sectional view of an intermediate manufactured material at a stage following the stage shown in FIG. 7 in a process according to a manufacturing method of a transparent electrode pattern according to an exemplary embodiment.
Figure 9:
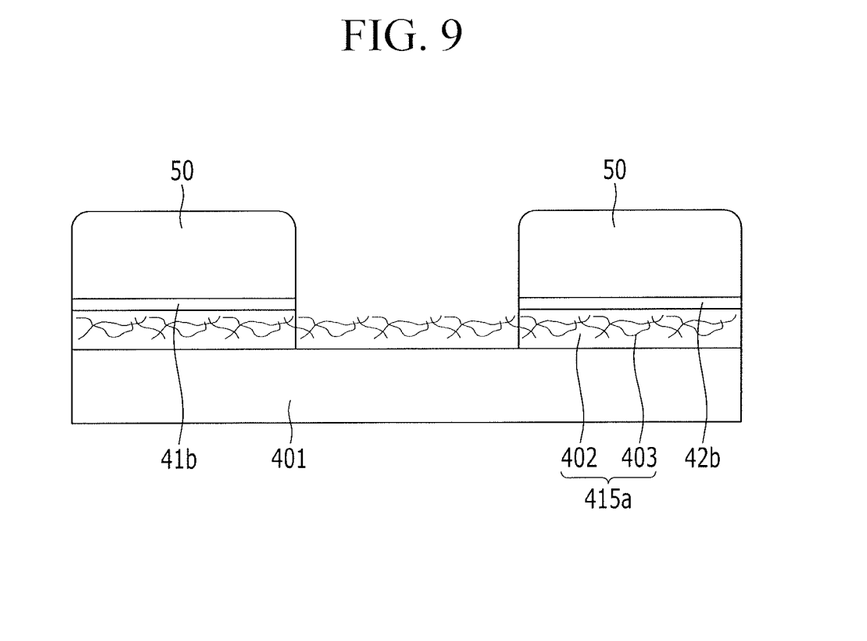
FIG. 9 illustrates a cross-sectional view of an intermediate manufactured material at a stage following the stage shown in FIG. 8 in a process according to a manufacturing method of a transparent electrode pattern according to an exemplary embodiment.

FIG. 6 is a cross-sectional view of an intermediate manufactured material in one stage of a process according to a manufacturing method of a transparent electrode pattern according to an exemplary embodiment, FIG. 7 is a cross-sectional view of an intermediate manufactured material of a stage following the stage shown in FIG. 6 in a process according to a manufacturing method of a transparent electrode pattern according to an exemplary embodiment. FIG. 8 is a cross-sectional view of an intermediate manufactured material of a stage following the stage shown in FIG. 7 in a process according to a manufacturing method of a transparent electrode pattern according to an exemplary embodiment, and FIG. 9 is a cross-sectional view of an intermediate manufactured material of a stage following the stage shown in FIG. 8 in a process according to a manufacturing method of a transparent electrode pattern according to an exemplary embodiment.

Referring to FIG. 6, the substrate 401 including a material having flexibility such as a polycarbonate, a polyimide, and polyethersulfone, and then a metal nanowire layer 403 including a metal nanowire such as a silver or copper nanowire may be formed thereon by a suitable method such as the solution process, the spraying process, and the printing process.

An acrylate-based organic material such as a polyester acrylate resin may be coated onto the metal nanowire layer 403 to form the overcoat 402. The overcoat 402 may be positioned between the metal nanowires, and may fill the space between the metal nanowires. The metal nanowire layer 403 forms a lower conductive layer 415a along with the overcoat 402.

An upper conductive layer 415b may be formed by depositing gallium tin oxide (GTO) on the metal nanowire layer 403 and the overcoat 402.

A photosensitive film may be coated on the upper conductive layer 415b and exposed and developed to form a photosensitive film pattern 50.

Referring to FIG. 7, the upper conductive layer 415b is dry-etched by using the photosensitive film pattern 50 as a mask. As the gas for the dry-etching, fluorine (F) or chlorine ($Cl_2$) gas is used, as examples.

Referring to FIG. 8, a compound of the composition of the upper conductive layer 415b that is not covered by the photosensitive film pattern 50 and the dry-etching gas may be generated. The boiling point of the compound may be less than room temperature such that the exposed upper conductive layer 415b may be etched to be removed. Accordingly, the first upper conductive layer 41b and the second upper conductive layer 42b that are separated from each other may be formed.

In this case, by controlling the condition such as the dry-etching gas concentration and the etching time, as shown in FIG. 8, only the upper conductive layer 415b may be etched, or, as shown in FIG. 9, the overcoat 402 of the lower conductive layer 415a that is not covered by the photosensitive film pattern 50 to be exposed may be partially etched such that the lower conductive layer 415a including the overcoat 402 that is partially patterned may be formed. As shown in FIG. 9, the overcoat 402 of the portion that is not covered by the photosensitive film pattern 50 and is exposed may be totally removed.

The etching gas used in the dry-etching process of the upper conductive layer 415b may react with the metal nanowire of the metal nanowire layer 403, thereby forming the metal compound. For example, when the metal nanowire includes a silver nanowire, silver nanowire (AgNW) of the lower conductive layer 415a that is not covered by the photosensitive film pattern 50 and is exposed may react with the dry-etching gas such as chlorine gas $Cl_2$, thereby forming silver chlorine (AgCl).

The photosensitive film pattern 50 may be stripped by using a stripper such as an organic solution. In this case, the metal compound of the metal nanowire layer 403 of the lower conductive layer 415a that is not covered by the photosensitive film pattern 50 and the first and second upper conductive layers 41b and 42b and is exposed may have high solubility to the organic solution of the stripper of the photosensitive film pattern 50. Thereby, the exposed metal nanowire layer 403 may also be removed when stripping the photosensitive film pattern 50. As shown in FIG. 1 or FIG. 2, the first and second lower conductive layers 41a and 42a positioned under the patterned first and second upper conductive layers 41b and 42b may be formed. The metal nanowire may not be substantially present in the region between the first and second upper conductive layers 41b and 42b. The edge of the first lower conductive layer 41a and the edge of the first upper conductive layer 41b may be substantially aligned. The edge of the second lower conductive layer 42a and the edge of the second upper conductive layer 42b may be substantially aligned.

Accordingly, the first electrode 41 and the second electrode 42 shown in FIG. 1 or FIG. 2 may be completed.

In the manufacturing method of the transparent electrode pattern according to an exemplary embodiment, the GTO included in the upper conductive layer 415b is a transparent conductive material that may be easily etched such that etch selectivity for the overcoat 402 positioned thereunder is easily obtained when dry-etching. Accordingly, damage to the overcoat 402 and the substrate 401 may be minimized in the dry-etching process of the upper conductive layer 415b. As shown in FIG. 8, by reducing the damage of the overcoat 402 without the etching of the overcoat 402, the optical haze of the entire substrate 401 including the transparent electrode pattern may be minimized and the transmittance may be increased.

Also, as described above, the metal nanowire of the metal nanowire layer 403 that was not covered by the first and second upper conductive layer 41b and 42b may be selectively removed when stripping the photosensitive film pattern 50. Accordingly, the distance between the first lower conductive layer 41a of the first electrode 41 and the second lower conductive layer 42a of the second electrode 42 may be freely controlled such that the pitch of the transparent electrode pattern may be reduced. The formation of the fine transparent electrode pattern may be possible.

Also, a volatile etching by-product may be prevented from being generated through the dry-etching of the upper conductive layer 415*b*.

Next, a manufacturing method of the transparent electrode pattern according to an exemplary embodiment will be described with reference to FIG. 10 to FIG. 14 as well as FIG. 1 and FIG. 2.

Figure 10:
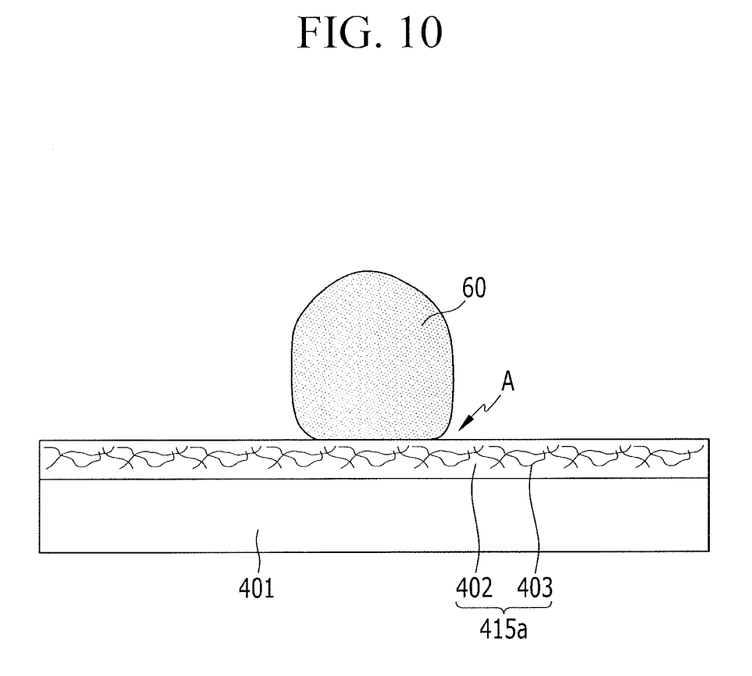
FIG. 10 illustrates a cross-sectional view of an intermediate manufactured material at a stage of a process according to a manufacturing method of a transparent electrode pattern according to an exemplary embodiment.
Figure 11:
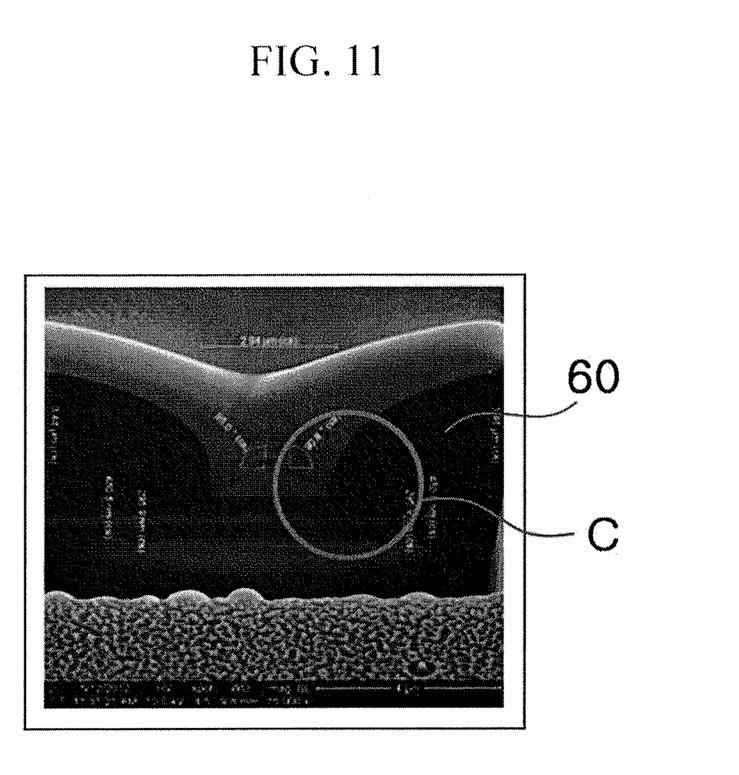
FIG. 11 illustrates a photo showing a cross-sectional view of an intermediate manufactured material at a stage of a process according to a manufacturing method of a transparent electrode pattern according to an exemplary embodiment.
Figure 12:
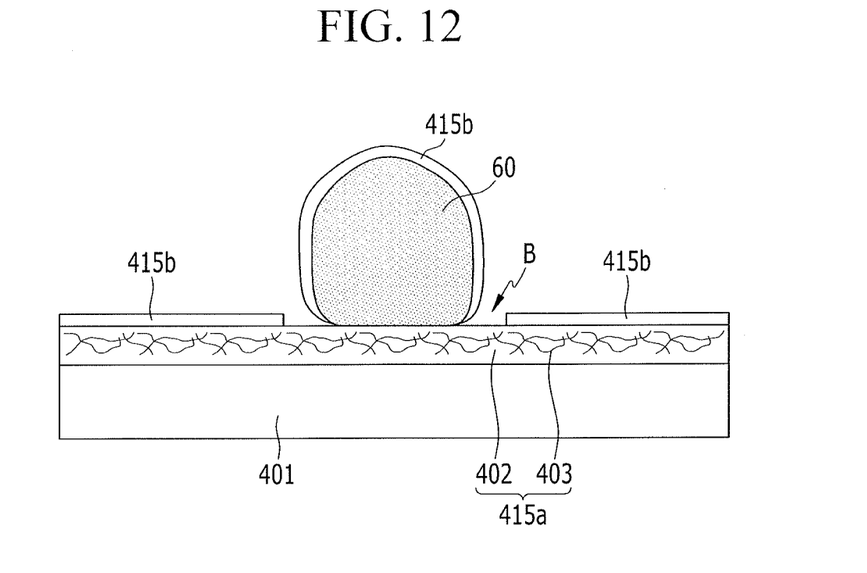
FIG. 12 illustrates a cross-sectional view of an intermediate manufactured material at a stage following the stage shown in FIG. 10 in a process according to a manufacturing method of a transparent electrode pattern according to an exemplary embodiment.
Figure 13:
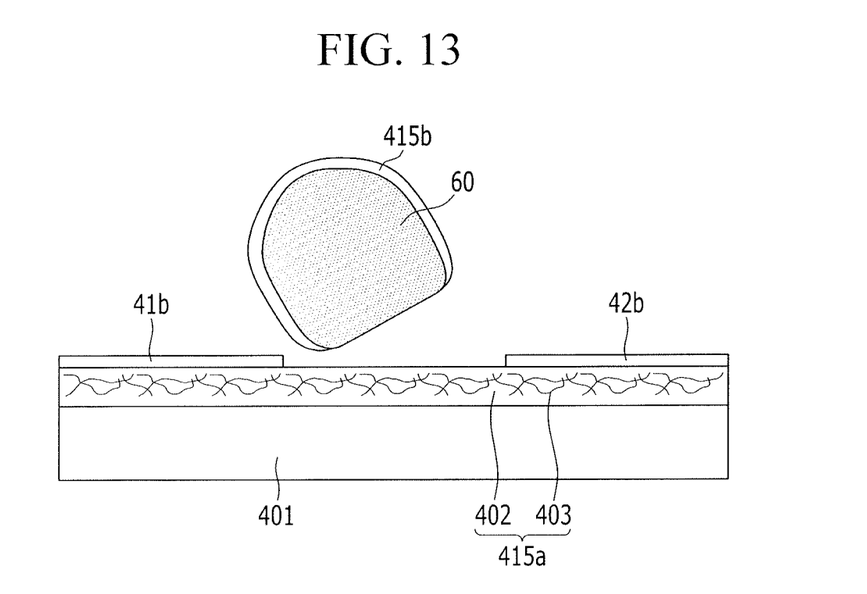
FIG. 13 illustrates a cross-sectional view of an intermediate manufactured material at a stage following the stage shown in FIG. 12 in a process according to a manufacturing method of a transparent electrode pattern according to an exemplary embodiment.
Figure 14:
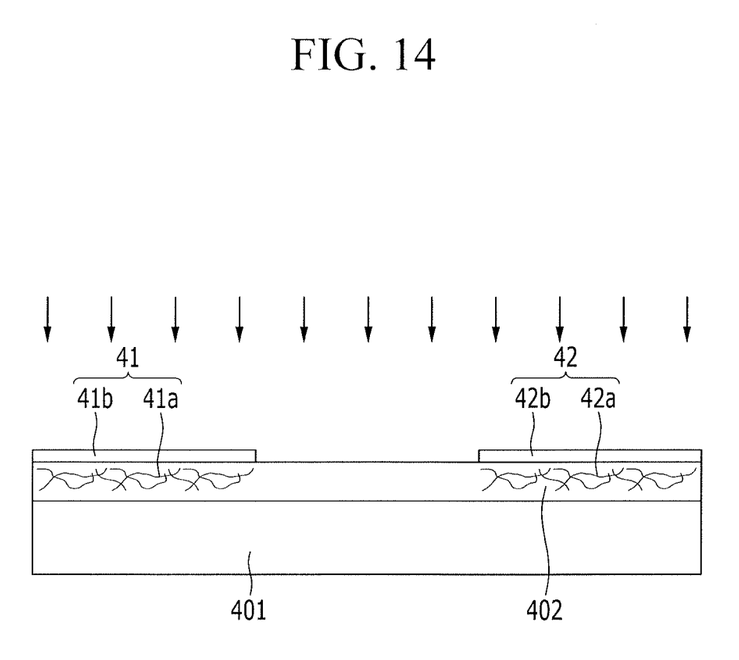
FIG. 14 illustrates a cross-sectional view of an intermediate manufactured material at a stage following the stage shown in FIG. 13 in a process according to a manufacturing method of a transparent electrode pattern according to an exemplary embodiment.

FIG. 10 is a cross-sectional view of an intermediate manufactured material in a stage of a process according to a manufacturing method of a transparent electrode pattern according to an exemplary embodiment, FIG. 11 is a photo showing a cross-sectional view of an intermediate manufactured material in a stage of a process according to a manufacturing method of a transparent electrode pattern according to an exemplary embodiment, FIG. 12 is a cross-sectional view of an intermediate manufactured material of a stage following the stage shown in FIG. 10 in a process according to a manufacturing method of a transparent electrode pattern according to an exemplary embodiment, FIG. 13 is a cross-sectional view of an intermediate manufactured material of a stage following the stage shown in FIG. 12 in a process according to a manufacturing method of a transparent electrode pattern according to an exemplary embodiment, and FIG. 14 is a cross-sectional view of an intermediate manufactured material of a stage following the stage shown in FIG. 13 in a process according to a manufacturing method of a transparent electrode pattern according to an exemplary embodiment.

First, referring to FIG. 10, the substrate 401 including the material having flexibility, such as a polycarbonate, a polyimide, and polyethersulfone, may be provided. A metal nanowire layer 403 including a metal nanowire such as a silver or copper nanowire may be formed thereon by using a suitable method such as a solution process, a spraying process, or a printing process.

An acrylate-based organic material such as a polyester acrylate resin may be coated onto the metal nanowire layer 403 to form the overcoat 402. The overcoat 402 may be positioned between the metal nanowires, and may fill the space between the metal nanowires. The metal nanowire layer 403 may form the lower conductive layer 415*a* along with the overcoat 402.

Next, a photosensitive film may be coated onto the upper conductive layer 415*b* and exposed and developed to form a photosensitive film pattern 60. Next, heat may be applied to the photosensitive film pattern 60 for hard baking. In this case, a temperature of the hard baking may be controlled such that the photosensitive film pattern 60 may reflow. If the photosensitive film pattern 60 reflows, the side surface of the lower portion of the photosensitive film pattern 60 may protrude (over-hang) in an outside direction by a friction force between the lower conductive layer 415*a* and the bottom surface of the photosensitive film pattern 60, as shown in FIG. 10, such that an undercut A may be generated.

Referring to FIG. 11, it may be confirmed that a protrusion may be generated in the outside direction like the portion C if the photosensitive film pattern 60 reflows by the hard baking such that the undercut structure is generated.

Next, referring to FIG. 12, the transparent conductive material may be deposited on the photosensitive film pattern 60 and the lower conductive layer 415*a* by sputtering to form the upper conductive layer 415*b*. The upper conductive layer 415*b* may include the conductive metal oxide such as ITO, IZO, and GTO. The thickness of the upper conductive layer 415*b* may be in a range of about 50 Å to 200 Å. In this case, the upper conductive layer 415*b* may be disconnected by the undercut structure A of the photosensitive film pattern 60 near the edge of the photosensitive film pattern 60 such that an opening portion B is generated. The thickness of the upper conductive layer 415*b* may be thin. Accordingly, the opening portion B may be easily formed by the small undercut structure of the photosensitive film pattern 60.

Referring to FIG. 13, the photosensitive film pattern 60 may be stripped by using a stripper such as the organic solution. The portion of the upper conductive layer 415*b* positioned on the photosensitive film pattern 60 may be lifted off to be removed such that only the upper conductive layer 415*b* of the portion that is not covered by the photosensitive film pattern 60 remains. The first upper conductive layer 41*b* and the second upper conductive layer 42*b* that are separated from each other may be formed. In this case, the lift off of the upper conductive layer 415*b* on the photosensitive film pattern 60 may be easily performed due to the undercut structure A of the photosensitive film pattern 60.

Next, referring to FIG. 14, the first and second upper conductive layers 41*b* and 42*b* and the exposed upper surface of the lower conductive layer 415*a* may be subjected to a plasma treatment. In this case, the plasma treatment may be generated by using the plasma gas such as chlorine (Cl) and bromine (Br).

The metal nanowire of the lower conductive layer 415*a* that is not covered by the first and second upper conductive layers 41*b* and 42*b* and that is exposed in the plasma treatment may react with the plasma gas, thereby forming the metal compound. For example, when the metal nanowire includes the silver nanowire, the silver nanowire may react with the plasma gas such as chlorine $Cl_2$, thereby forming silver chloride (AgCl). The metal compound such as silver chloride may be removed by using a stripper such as an organic solvent. As shown in FIG. 14, the first and second lower conductive layers 41*a* and 42*a* positioned under the patterned first and second upper conductive layers 41*b* and 42*b* may be formed. The metal nanowire may not substantially exist under the region between the first and second upper conductive layers 41*b* and 42*b*. The edge of the first lower conductive layer 41*a* and the edge of the first upper conductive layer 41*b* may be substantially aligned. The edge of the second lower conductive layer 42*a* and the edge of the second upper conductive layer 42*b* may be substantially aligned.

According to the present exemplary embodiment, by the plasma treatment for the removal of the metal nanowire, the composition of the plasma gas such as chlorine (Cl) and bromine (Br) may remain on the surface of the first and second upper conductive layers 41*b* and 42*b* and/or the surface of the overcoat 402 between the first and second upper conductive layers 41*b* and 42*b*.

Accordingly, the first electrode 41 and the second electrode 42 that are separated may be completed. The overcoat 402 may also be positioned between the first lower conductive layer 41*a* and the second lower conductive layer 42*a*. The overcoat 402 may be connected as one unity on the entire substrate 401. According to the present exemplary embodiment, when the overcoat 402 is not etched, damage may hardly be generated such that an optical haze of the entire substrate 401 may be minimized and the transmittance may be increased.

The metal nanowire of the metal nanowire layer 403 that is not covered by the first and second upper conductive layers 41*b* and 42*b* may be selectively removed through the plasma treatment and the stripping process such that the distance between the first lower conductive layer 41*a* of the first electrode 41 and the second lower conductive layer 42a of the second electrode 42 may be freely controlled, the pitch of the transparent electrode pattern may be reduced, and the fine transparent electrode pattern may be formed.

By way of summation and review, embodiments provide a transparent electrode pattern in which transmittance may be increased, a pitch of the transparent electrode pattern may be reduce, and optical haze may be minimized when the transparent electrode pattern includes a nanowire such as a metal nanowire.

Embodiments provide a manufacturing method of a transparent electrode pattern in which transmittance may be increased, a pitch of the transparent electrode pattern may be reduced, and optical haze may be minimized when the transparent electrode pattern includes a nanowire such as a metal nanowire.

Embodiments provide a touch sensor including a transparent electrode pattern including a nanowire such as the metal nanowire, such that transmittance may be increased, a pitch of the transparent electrode pattern may be reduced, and optical haze may be minimized.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A transparent electrode pattern, comprising:
a first electrode and a second electrode spaced apart from one another laterally on a substrate, the first electrode and the second electrode each being formed on a same plane, wherein:
the first electrode includes a first lower conductive layer on the substrate and a first upper conductive layer on the first lower conductive layer; and
the second electrode including a second lower conductive layer on the substrate and a second upper conductive layer on the second lower conductive layer,
the first lower conductive layer, the first upper conductive layer, the second lower conductive layer and the second upper conductive layer are transparent layers,
the first and second lower conductive layers each include a metal nanowire and an overcoat, a first portion of the overcoat extending laterally beyond the metal nanowire into a space between the first electrode and the second electrode, and
the first and second upper conductive layers include a transparent conductive material that is dry-etchable.

2. The transparent electrode pattern as claimed in claim 1, wherein:
the first and second upper conductive layers include GTO (gallium tin oxide).

3. The transparent electrode pattern as claimed in claim 2, wherein:
a first edge of the first lower conductive layer and a first edge of the first upper conductive layer are substantially aligned, the metal nanowire of the first lower conductive layer not extending beyond the first edge into the first portion of the overcoat, and
a second edge of the second lower conductive layer and a second edge of the second upper conductive layer are substantially aligned, the metal nanowire of the second lower conductive layer not extending beyond the second edge into the first portion of the overcoat.

4. The transparent electrode pattern as claimed in claim 1, wherein:
the first portion overcoat that extends to be positioned between the first lower conductive layer and the second lower conductive layer is in direct contact with the substrate.

5. A method for manufacturing a transparent electrode pattern, the method comprising:
forming a lower conductive layer including a metal nanowire and an overcoat on a same plane of a substrate, the lower conductive layer being transparent;
forming a photosensitive film pattern on the lower conductive layer;
reflowing the photosensitive film pattern to form an undercut structure;
depositing a transparent conductive material on the photosensitive film pattern and the lower conductive layer to form an upper conductive layer;
stripping the photosensitive film pattern and lifting off the upper conductive layer positioned on the photosensitive film pattern to form a first upper conductive layer and a second upper conductive layer that are separated from each other;
plasma treating an upper face of the first and second upper conductive layers and the lower conductive layer with a plasma gas, thereby forming a metal compound combined with the overcoat in a first region of the lower conductive layer that is not covered by the first and second upper conductive layers; and
selectively removing the metal compound from the overcoat in the first region such that a first portion of the overcoat remains in the first region between the first and second upper conductive layers.

6. The method as claimed in claim 5, wherein:
the plasma gas includes chlorine (Cl) or bromine (Br).

7. A touch sensor, comprising:
a plurality of touch electrodes, the plurality of touch electrodes including a first electrode and a second electrode spaced apart from one another laterally on a substrate, the first electrode and the second electrode each being formed on a same plane, wherein:
the first electrode includes including a transparent first lower conductive layer on the substrate and a transparent first upper conductive layer on the first lower conductive layer; and
the second electrode includes a transparent second lower conductive layer on the substrate and a transparent second upper conductive layer on the second lower conductive layer,
wherein the first and second lower conductive layers each include a metal nanowire and an overcoat, a first portion of the overcoat extending laterally beyond the metal nanowire into a space between the first electrode and the second electrode, and
the first and second upper conductive layers include a transparent conductive material that is dry-etchable.

8. The touch sensor as claimed in claim 7, wherein:
the first and second upper conductive layers include GTO (gallium tin oxide).

9. A touch sensor, comprising a plurality of touch electrodes, the plurality of touch electrodes including:
- a first electrode including a transparent first lower conductive layer and a transparent first upper conductive layer positioned on the first lower conductive layer; and
- a second electrode spaced apart from the first electrode and including a transparent second lower conductive layer and a transparent second upper conductive layer positioned on the second lower conductive layer, wherein:
- the first and second lower conductive layers include a metal nanowire wherein the first and second lower conductive layers further include an overcoat, the overcoat extending to be positioned between the first lower conductive layer and the second lower conductive layer, and the metal nanowire being at least partially removed between the first lower conductive layer and the second lower conductive layer,
- the first and second upper conductive layers include a transparent conductive material, and
- a plasma gas composition including chlorine (Cl) or bromine (Br) is present on a surface of the first and second upper conductive layers.

10. The touch sensor as claimed in claim 9, wherein:
- an edge of the first lower conductive layer and an edge of the first upper conductive layer are substantially aligned, and
- an edge of the second lower conductive layer and an edge of the second upper conductive layer are substantially aligned.

* * * * *